Dec. 1, 1931.  R. E. HAMILTON  1,833,992
DOUGH CONDITIONING MACHINE
Filed Dec. 22, 1926   2 Sheets-Sheet 1

INVENTOR.
Royal E. Hamilton

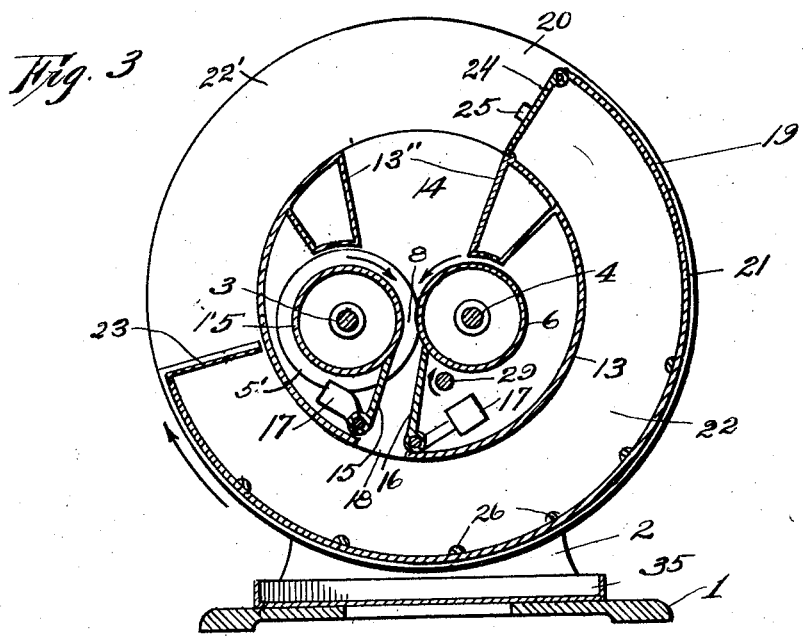
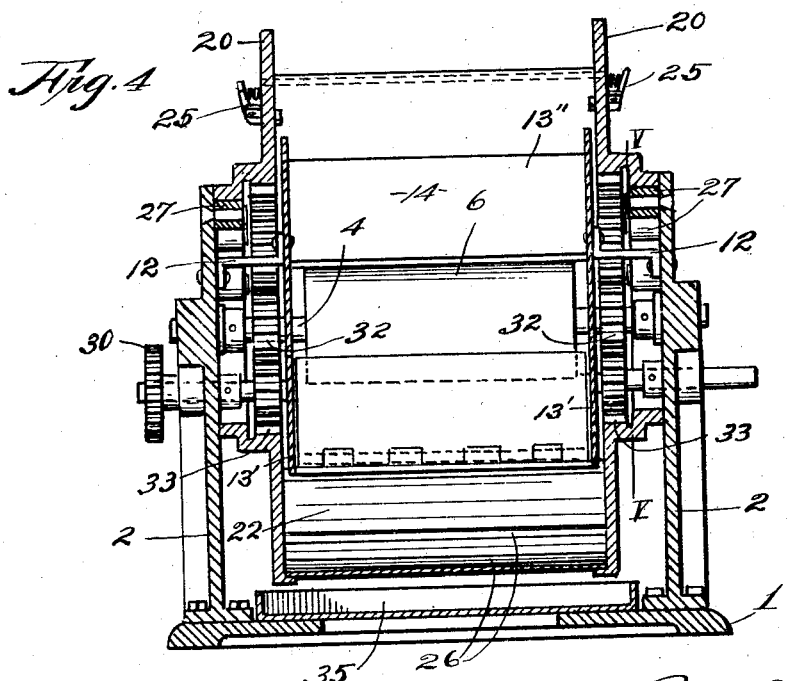

Patented Dec. 1, 1931

1,833,992

UNITED STATES PATENT OFFICE

ROYAL E. HAMILTON, OF KANSAS CITY, KANSAS, ASSIGNOR TO WILLIAM HENRY KEENAN, OF CHICAGO, ILLINOIS

DOUGH CONDITIONING MACHINE

Application filed December 22, 1926. Serial No. 156,337.

This invention relates to new and useful improvements in dough conditioning machines and particularly to that type in which a mass of dough is automatically massed and passed through conditioning rollers.

This conditioning is done prior to forming the dough into loaves and is for the purpose of producing a white and fine grained loaf of bread. It is desired not to be limited to the conditioning of bread dough, as it may be used wherever the conditioning of dough is essential in the production of any bakery product.

The primary object of this invention is to provide a dough conditioning machine in which a mass of dough is automatically passed through a pair of conditioning rollers a predetermined number of times.

Another object is to provide a dough conditioning machine in which a mass of dough is passed through a pair of conditioning rollers, then into a dough carrier where it is automatically rolled or formed into a mass and again delivered to the conditioning rollers, thus doing away with the existing hand operations of folding the dough and feeding it to the conditioning rollers.

A further object of this invention is to provide a simple dough conditioning machine in which a mass of dough is automatically conditioned by the continuous operation of the machine, thus making the conditioning uniform and rapid.

With the foregoing general objects in view, the invention will now be described by reference to the accompanying drawings, illustrating one form of the invention, after which the various novel features therein will be particularly set forth and claimed.

In the drawings:

Fig. 3 is a vertical cross section through the central portion of the dough conditioning machine;

Fig. 4 is a vertical longitudinal section taken on line IV—IV of Figure 1; and

Figure 1:
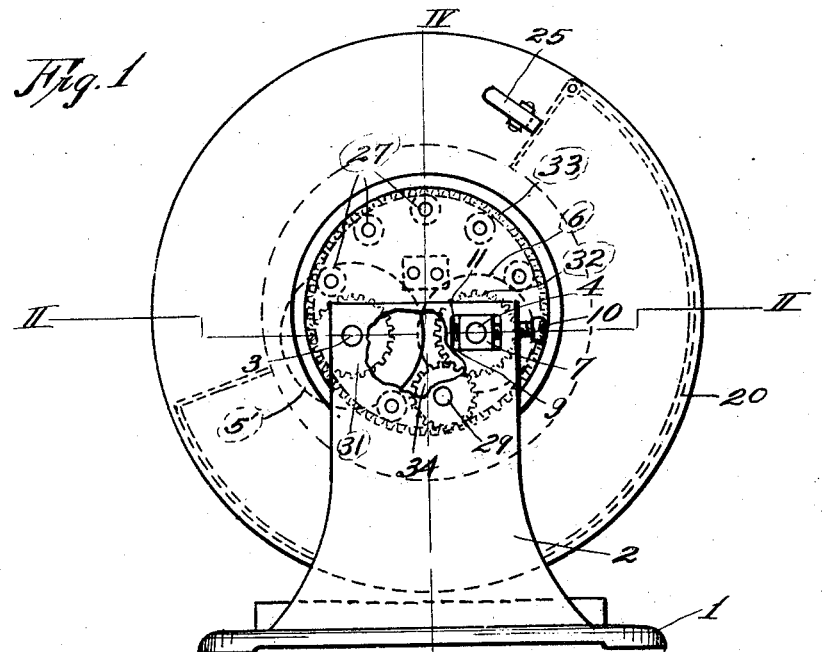
Figure 1 is an end elevation of my dough conditioning machine with a part of the standard broken away.
Figure 2:
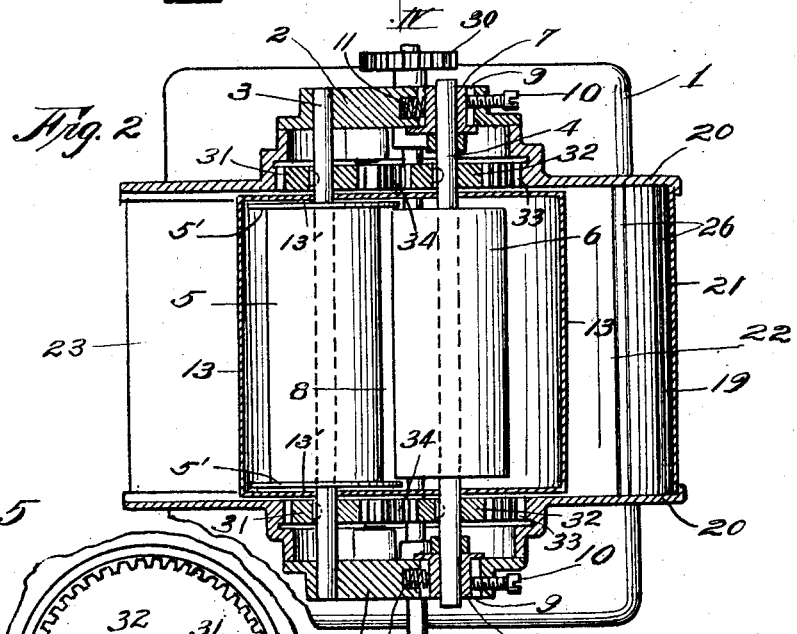
Fig. 2 is a horizontal section taken on line II—II of Figure 1.
Figure 5:
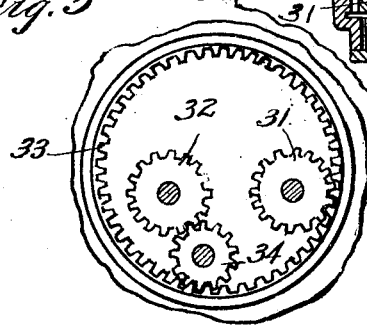
Fig. 5 is a fragmentary section taken on line V—V of Figure 4.

Similar reference characters designate like parts throughout the several views and the numeral 1 designates a suitable base having two upwardly extending standards 2, which are securely attached to the base 1. Rotatably mounted in the end standards 2 are two shafts 3 and 4 on which are securely mounted conditioning rollers 5 and 6 respectively. Roller 5 is provided with end flanges 5' which serve to hold the dough in position while it is passing through the rollers.

Shaft 4 is mounted in adjustable journal boxes 7 in order that roller 6 may be moved to and from the roller 5, thus varying the space 8 between the two rollers 5 and 6. Preferably the journal boxes 7 are mounted in rectangular openings 9 in standards 2 and are provided with adjusting screws 10 by means of which they may be moved back and forth in the rectangular opening 9 against the action of the compression springs 11.

The plane of the axes of the conditioning rollers is shown substantially horizontal, but it may be varied from the horizontal, if desired.

Partially surrounding the conditioning rollers 5 and 6 and securely attached to the standard 2 by means of brackets 12 is a cylindrical housing 13 having end members 13'.

The upper portion of the housing 13 is open its full length and has downwardly extending side walls 13", thus forming a hopper 14 which communicates with upper surface of the conditioning rollers 5 and 6.

Below the conditioning rollers 5 and 6 and spaced apart from each other are two scrapers 15 and 16 which are hinged to the housing 13 and bear against the rollers 5 and 6 respectively, thus keeping the surface of the rollers free from an accumulation of dough. Scrapers 15 and 16 are held yieldingly against the rollers 5 and 6 by means of gravity weights 17. The spacing apart of the scrapers 15 and 16 forms a passageway from the conditioning rollers to an opening 18 in the lower portion of housing 13.

Without and concentric with housing 13 is a dough carrier 19 having two circular end plates 20 to which is attached a casing 21 which extends between the circular end plates 20 and part way around their outer periphery.

The casing 21 is concentric with and spaced apart from the housing 13, thus forming a dough carrier chamber 22. At one edge of the casing 21 and extending inwardly to the housing 12 is an end plate 23, while at the opposite edge of casing 21 is a closure 24 which is hinged to and extends between the two end plates 20. Closure 24 is normally held in a closed position by means of latches 25. A portion of the dough carrier over which the casing 21 does not extend is open to the inner casing 13 and is designated as 22'.

The inner surface of casing 21 may be provided with longitudinally extending slats 26, which will assist in rolling the dough into a mass.

The end plates are rotatably mounted on standards 2 by means of rollers 27 which are mounted on standards 2 and bearings 28 located in the outer portion of two end plates 20.

Referring now to the driving means, the drive shaft 29 is mounted in the standards 2 and provided with a gear wheel 30 which may be driven by any suitable means, not here shown.

Rigidly mounted on shafts 3 and 4 respectively, are spur gears 31 and 32. End plates 20 are provided with internal gears 33. Drive shaft 29 is also provided with spur gears 34 which mesh with the internal gears 33 and spur gears 32. Spur gears 31 are in working engagement with the internal gears 34. It will be noted that gears 32 and 34 are so positioned as to allow an adjustment of roller 6 without interfering with meshing of the gears.

Thus, when the drive shaft is driven in the direction indicated by the arrow, the conditioning rollers will be driven in opposite directions with their paths both downward toward the space between them, while the direction of rotation of the dough carrier 19 will be in the direction indicated by the arrow.

While drive gears are shown at each end of the rollers, it is obvious that a single set of gears would drive the machine. By changing the sizes of the gears, the ratio of speeds of the conditioning rollers 5 and 6 and the dough carrier 19 may be varied.

Located beneath the dough carrier 19 and supported on the base 1 is a drip pan 35 to receive any drippings from the parts above. This pan is so located as to be easily removed and cleaned.

Operation

In the operation of my improved dough conditioning machine, a mass of dough which is ready to be conditioned is delivered through the opening 22' and into the hopper 14. This may be done when the opening 22' is in register with the hopper 14 whether the machine is in motion or not. These parts are best shown in Fig. 3. When the machine is in motion and the dough is resting on the conditioning rollers 5 and 6, the weight of the dough and the direction of rotation of the conditioning rollers 5 and 6 as described above, will cause the dough to be fed through the conditioning rollers in a sheet, the thickness of which will be determined by the distance of the space between the rollers, then between the scrapers 15 and 16 through the opening 18 and into the dough carrier 19 which is traveling in the direction indicated by the arrow. The sheet of dough will engage the inner side of the casing 21 and rest on slats 26 and be carried upward to a point, where due to gravity, it falls back on itself and causes a folding or rolling together of the sheet of dough.

The rate of travel of the conditioning rollers 5 and 6 and the rotation of the dough carrier 19 are so timed that after the dough has all been fed into the dough carrier 19, the closure 24 will engage the dough and carry it upwardly over the outer surface of the casing 13, which will cause a further rolling of the sheet of dough, after which it will again be delivered into the hopper 14 where the same operation will be repeated. This operation may be continued a sufficient number of times to properly condition the dough. When the dough is properly conditioned, the machine may be stopped when the dough is resting on the closure 24 and by releasing the latches 25 the closure will drop open, thus depositing the dough on any desirable receptacle.

It will thus be seen that a comparatively simple, compact and efficient arrangement and construction for fulfilling the objects of the invention has been devised and while there is illustrated what now seems to constitute the preferred form of construction, it is desired to reserve the right to make such changes as will fairly fall within the scope of the appended claims.

Having thus described the invention, what I claim is new and desire to secure by Letters Patent is:

1. A dough conditioning machine, a semi-cylindrical carrier having a lateral opening and end closures, a stationary casing positioned concentrically within and spaced apart from the lateral wall of said carrier, having an upper and lower lateral opening therein, and a pair of conditioning rollers positioned in said stationary casing, and means for rotating said rollers and carrier.

2. A dough conditioning machine, a semi-cylindrical carrier having a lateral opening, a stationary casing positioned concentrically within and spaced apart from the lateral wall of said carrier, having an upper and lower lateral opening therein, a radially disposed closure carried by said carrier, adjacent the lateral opening therein for substantially closing the space between the lateral wall of said carrier and the lateral wall of said stationary casing and a pair of conditioning rollers positioned in said stationary casing means for rotating the carrier and the rollers.

3. In a dough conditioning machine, conditioning rollers, a dough carrier rotatably mounted about said rollers adapted to receive the dough from and deliver it to said conditioning rollers, said dough carrier having an opening in its lateral surface and an in-turned flange adjacent each of the opposite edges of said opening, and means for rotating said conditioning rollers and said dough carrier simultaneously at constant relative speeds during the entire operation of the machine.

4. In a dough conditioning machine, a casing; rotatable conditioning rollers mounted in the casing in a fixed plane; a rotatable hollow, semi-cylindrical dough carrier drum having an opening in its lateral surface, said drum being mounted concentrically about the casing; radially disposed closures carried by the drum, extending between the drum and the casing; and means for simultaneously rotating the rollers and the drum.

5. In a dough conditioning machine, a pair of rotatable conditioning rollers mounted in a stationary casing, a hollow dough-carrier rotatable about said casing; radially disposed flanges mounted on said carrier, extending between the casing and the lateral surface of the carrier, and means for rotating the rollers and the carrier.

6. In a dough conditioning machine, a rotatable dough carrier having an opening in its lateral surface; conditioning rollers rotatably mounted in a casing, said casing being positioned concentrically within the carrier and spaced therefrom, radially disposed closures for the openings extending between the surface of the casing and the surface of the carrier; and means for rotating the rollers and the carrier.

7. In a dough conditioning machine, a casing; rotatable conditioning rollers mounted in said casing, a hollow rotatable dough carrier mounted concentrically with said casing and spaced apart therefrom, a radially disposed hingedly mounted closure for the opening extending between the surface of the casing and the surface of the carrier; releasable means for holding said closure in fixed relation to said carrier; and means for rotating said rollers and carrier.

8. In a dough conditioning machine, a rotatably mounted hollow dough carrier having an opening in its lateral surface; a stationary casing positioned concentrically within and spaced apart from said carrier and having openings formed in the lateral side thereof; a hingedly mounted radially disposed closure positioned to close the opening between the surface of the carrier and the surface of the casing; rotatably mounted conditioning rollers positioned within said casing, and means for rotating said carrier and conditioning rollers.

9. In a dough conditioning machine, a rotatable hollow dough carrier; a stationary casing having openings in its lateral wall and positioned within and spaced apart from said carrier; a closure carried by said carrier and extending between the casing and the lateral surface of the carrier, rotatable conditioning rollers positioned within said casing and means for rotating said rollers and carrier.

In testimony whereof, I hereunto affix my signature.

ROYAL E. HAMILTON.